United States Patent
Matsui et al.

(10) Patent No.: US 11,206,326 B2
(45) Date of Patent: Dec. 21, 2021

(54) USER TERMINAL, SERVER DEVICE, AND METHOD OF SETTING COMMUNICATION PARAMETER

(71) Applicants: OMRON HEALTHCARE CO., LTD., Muko (JP); OMRON Corporation, Kyoto (JP)

(72) Inventors: Toshinori Matsui, Kyoto (JP); Toshimasa Ietake, Kyoto (JP)

(73) Assignees: OMRON HEALTHCARE CO., LTD., Kyoto (JP); OMRON CORPORATION, Kyoto (JP)

( * ) Notice: Subject to any disclaimer, the term of this patent is extended or adjusted under 35 U.S.C. 154(b) by 0 days.

(21) Appl. No.: 16/701,315

(22) Filed: Dec. 3, 2019

(65) Prior Publication Data

US 2020/0106874 A1    Apr. 2, 2020

Related U.S. Application Data (63) Continuation of application No. PCT/JP2018/028832, filed on Aug. 1, 2018.

(30) Foreign Application Priority Data

Aug. 9, 2017    (JP) .............................. JP2017-153748

(51) Int. Cl.
*H04W 76/10* (2018.01)
*H04M 1/72412* (2021.01)
(Continued)

(52) U.S. Cl.
CPC ........ *H04M 1/72412* (2021.01); *H04L 69/24* (2013.01); *H04W 4/80* (2018.02); *H04W 76/14* (2018.02)

(58) Field of Classification Search
CPC combination set(s) only.
See application file for complete search history.

(56) References Cited

U.S. PATENT DOCUMENTS 9,867,217 B1 *   1/2018  Guven .............. H04M 3/42246
10,165,427 B1 * 12/2018  Mikelich ............. H04L 43/0823
(Continued)

FOREIGN PATENT DOCUMENTS

| CN | 101115294 A | 1/2008 |
| CN | 101395929 A | 3/2009 |

(Continued)

OTHER PUBLICATIONS

Official Communication issued in International Patent Application No. PCT/JP2018/028832, dated Oct. 23, 2018.
(Continued)

*Primary Examiner* — Cindy Trandai
(74) *Attorney, Agent, or Firm* — Keating and Bennett, LLP (57) ABSTRACT

A user terminal according to one aspect of the present invention performs a first step of determining a communication parameter value used for wireless communication with the external device by selecting one communication parameter set from a plurality of communication parameter sets each defining a communication parameter value or by receiving designation of a communication parameter value by a user, a second step of making a wireless communication attempt with the external device based on the determined communication parameter value, and a third step of reporting a result of the wireless communication attempt and terminal information of an own device to an external server device.

10 Claims, 6 Drawing Sheets

(51) Int. Cl.
*H04W 76/14* (2018.01)
*H04W 4/80* (2018.01)
*H04L 29/06* (2006.01)

(56) References Cited

U.S. PATENT DOCUMENTS

| | | | |
|---|---|---|---|
| 2006/0143181 A1* | 6/2006 | Liu | H04L 41/12 |
| 2007/0210938 A1 | 9/2007 | Deurwaarder et al. | |
| 2010/0027414 A1 | 2/2010 | Hamachi | |
| 2010/0034120 A1* | 2/2010 | Nakajima | H04W 48/08 370/255 |
| 2011/0281573 A1 | 11/2011 | Otsuka et al. | |
| 2012/0178488 A1* | 7/2012 | Jonker | H04W 8/005 455/517 |
| 2013/0310108 A1* | 11/2013 | Altman | H04W 8/18 455/552.1 |
| 2013/0331141 A1* | 12/2013 | Montemurro | H04W 4/06 455/515 |
| 2014/0213241 A1* | 7/2014 | Altintas | G06F 16/00 455/418 |
| 2017/0064755 A1* | 3/2017 | Ha | H04W 76/11 |
| 2017/0086084 A1* | 3/2017 | Jarvis | H04W 24/10 |
| 2017/0147752 A1 | 5/2017 | Deno et al. | |
| 2018/0070290 A1* | 3/2018 | Breaux | H04W 4/40 |
| 2018/0182491 A1* | 6/2018 | Belliveau | A61B 5/0004 |
| 2018/0197434 A1 | 7/2018 | Kan et al. | |

FOREIGN PATENT DOCUMENTS

| | | |
|---|---|---|
| CN | 101640907 A | 2/2010 |
| CN | 104202799 A | 12/2014 |
| EP | 2 071 800 A2 | 6/2009 |
| JP | 2009-536794 A | 10/2009 |
| JP | 2017-012604 A | 1/2017 |
| JP | 2017-045142 A | 3/2017 |
| WO | 2010/082334 A1 | 7/2010 |

OTHER PUBLICATIONS

English translation of Official Communication issued in International Patent Application No. PCT/JP2018/028832, dated Feb. 13, 2020.
Official Communication issued in corresponding Chinese Patent Application No. 201880040575.2, dated Sep. 25, 2020.
Official Communication issued in corresponding German Patent Application No. 112018002839.9, dated Dec. 31, 2020.
Official Communication issued in corresponding Chinese Patent Application No. 201880040575.2, dated Apr. 21, 2021.
Official Communication issued in corresponding Chinese Patent Application No. 201880040575.2, dated Jul. 19, 2021.

* cited by examiner

| ID | Model | OS | Communication parameter | Connection availability |
|---|---|---|---|---|
| 00001 | A Model | abcOS | Set A | × |
| 00002 | A Model | abcOS | Set B | × |
| 00003 | A Model | abcOS | Set C | ○ |
| ⋮ | ⋮ | ⋮ | ⋮ | ⋮ |

USER TERMINAL, SERVER DEVICE, AND METHOD OF SETTING COMMUNICATION PARAMETER

CROSS-REFERENCE TO RELATED APPLICATIONS

This application is a Continuation Application of PCT Application No. PCT/JP2018/028832, filed Aug. 1, 2018 and based upon and claiming the benefit of priority from Japanese Patent Application No. 2017-153748, filed Aug. 9, 2017, the entire contents of all of which are incorporated herein by reference.

FIELD

The present invention relates to a user terminal, a server device, and a method of setting a communication parameter.

BACKGROUND

In recent years, wireless communication techniques have been used in various situations. For example, a measuring device with a wireless communication module is known, examples of which include a weight and body composition monitor, a blood pressure monitor, an activity monitor, a blood glucose monitor, a pedometer, and a thermometer (refer to Jpn. Pat. Appln. KOKAI Publication No. 2017-012604, and Jpn. Pat. Appln. KOKAI Publication No. 2017-045142). According to this measuring device, it is possible to transfer a measurement result of a weight, a body fat, a blood pressure, activity amount, a blood glucose level, the number of steps, a body temperature, or the like, to a user terminal such as a smartphone or a tablet personal computer (PC) through wireless communication. This makes it possible to manage data of the measurement result and view the history in the user terminal.

However, a communication parameter value for performing wireless communication with an external device such as the above-described measuring device may be different depending on communication environments such as the user terminal's model or operating system (OS). If the communication parameter value is not appropriate, an error such as failure to establish a connection through wireless communication or failure to transmit data will occur, and there is a possibility that data exchange through wireless communication cannot be performed between the external device and the user terminal.

Therefore, conventionally, a provider providing applications wirelessly communicating with an external device examines in advance the communication parameter value appropriate for wireless communication with the external device for every communication environment. The provider adults the communication parameter value for every user terminal, and then provides the application to each user. Thus, it took much time to set a communication parameter suitable for the communication environment.

SUMMARY

The present invention adopts the following configuration.

A user terminal according to one aspect of the present invention includes one or more processors, a memory storing a program executable by the one or more processors, and a wireless communication interface configured to perform wireless communication with an external device, wherein according to the program, the one or more processors perform a first step of determining a communication parameter value used for wireless communication with the external device by selecting one communication parameter set from a plurality of communication parameter sets each defining a communication parameter value or by receiving designation of a communication parameter value by a user, a second step of controlling the wireless communication interface to make a wireless communication attempt with the external device based on the determined communication parameter value, and a third step of reporting a result of the wireless communication attempt and terminal information of an own device to an external server device.

According to this configuration, it is possible to attempt to perform wireless communication with the external device while appropriately switching the communication parameter values in the user terminal. Then, the result of the wireless communication attempt, i.e., information, indicating whether or not wireless communication with the external device has been successful when the designated communication parameter value has been used, can be stored in the external server in association with the terminal information of the user terminal. Therefore, according to this configuration, it is possible to collect knowledge on whether wireless communication with the external device is successful when the designated communication parameter value is applied to the predetermined communication environment. Based on this knowledge, a setting of a communication parameter suitable for each user terminal can be easily performed. Therefore, according to this configuration, a setting of a communication parameter suitable for a communication environment can be easily performed.

Note that the type of the external device may not be particularly limited as long as wireless communication is possible. Further, the wireless communication system may be appropriately selected according to the embodiment. For example, the wireless communication system used with an external device may be Bluetooth (registered trademark). Furthermore, the target communication parameter may be appropriately selected according to the wireless communication system and OS to be used. For example, if Bluetooth (registered trademark) is adopted for the wireless communication system while Android (registered trademark) is used for the OS of the user terminal, the target communication parameter may be at least one of the necessity of performing "createBond", the timing of performing "connect", the number of times to retry "connect", the timing of performing "discoverService", and the necessity of performing "removeBond".

In the user terminal according to the above aspect, in the third step, the one or more processors may report a communication parameter value with which wireless communication with the external device has been successful, as the result of the wireless communication attempt. According to this configuration, it is possible to collect information regarding the appropriate communication parameter setting for each communication environment. Therefore, a setting of a communication parameter suitable for a communication environment can be easily performed.

In the user terminal according to the above aspect, in the third step, the one or more processors may report a communication parameter value with which wireless communication with the external device has failed, as the result of the wireless communication attempt. According to this configuration, it is possible to collect information regarding the inappropriate communication parameter setting for each communication environment. Therefore, since it is possible to avoid applying such inappropriate communication parameter setting to each communication environment, a setting of a communication parameter suitable for a communication environment can be easily performed.

In the user terminal according to the above aspect, the one or more processors may repeatedly perform the first step and the second step until wireless communication with the external device is successful. According to this configuration, in the user terminal, a communication parameter used for wireless communication with an external device can be appropriately set, and this makes it possible to reliably collect information regarding a setting of the communication parameter appropriate for each communication environment.

In the user terminal according to the above aspect, the first step may include presenting the plurality of communication parameter sets to the user, and receiving from the user a selection of the one communication parameter set used for wireless communication with the external device from the plurality of communication parameter sets presented. According to this configuration, it is possible to enhance operativity when the communication parameter value used for wireless communication is determined in the user terminal.

A server device according to one aspect of the present invention includes one or more processors, and a memory storing a program executable by the one or more processors, wherein according to the program, the one or more processors perform collecting, from a first user terminal configured to perform wireless communication with an external device, a communication parameter value with which wireless communication between the first user terminal and the external device has been successful, and terminal information of the first user terminal, and applying, based on the terminal information, a setting of the communication parameter value with which wireless communication between, the first user terminal and the external device has been successful, to a second user terminal of a same type as the first user terminal.

According to this configuration, it is possible to collect knowledge about whether or not wireless communication with an external device is successful when the designated communication parameter value is applied to a predetermined communication environment. In addition, by applying the obtained knowledge to a similar communication environment (i.e., a user terminal of the same type as the user terminal from which the knowledge is obtained), it is possible to automate the setting of the communication parameter in the communication environment where knowledge is obtained. Therefore, according to this configuration, a setting of a communication parameter suitable for a communication environment can be easily performed.

In the server device according to the above aspect, when the second user terminal first performs wireless communication with the external device, the one or more processors may apply the setting of the communication parameter value with which wireless communication between the first user terminal and the external device has been successful to the second user terminal. According to this configuration, a setting of a suitable communication parameter can be easily performed at the initial stage, and this can reduce the possibility of errors occurring in wireless communication with the external device.

Another aspect of each of the user terminal and the server device according to each embodiment described above may be an information processing method realizing each configuration described above, a program, or a storage medium recording the program readable for a computer, a device, a machine, or the like. The recording medium readable for a computer, etc. is a medium storing information such as programs in an electronic, magnetic, optical, mechanical, or chemical manner.

For example, a method of setting a communication parameter according to one aspect of the present invention includes a first step of determining, at a first user terminal configured to perform wireless communication with an external device, a communication parameter value used for wireless communication with the external device by selecting one communication parameter set from a plurality of communication parameter sets each defining a communication parameter value or by receiving designation of a communication parameter value by a user, a second step of making, at the first user terminal, a wireless communication attempt with the external device based on the determined communication parameter value, and a third step of reporting, at the first user terminal, a result of the wireless communication attempt and terminal information of an own device to an external server device.

In the method according to the above method, in the third step, the first user terminal may report a communication parameter value with which wireless communication with the external device has been successful, as the result of the wireless communication attempt, and the method of setting the communication parameter may further include a fourth step of applying, at the server device and based on the terminal information, a setting of the communication parameter value with which wireless communication between the first user terminal and the external device has been successful, to a second user terminal of a same type as the first user terminal.

The present invention can provide a technique that facilitates a setting of a communication parameter suitable for a communication environment.

DETAILED DESCRIPTION

Hereinafter, an embodiment according to one aspect of the present invention (also referred to as "present embodiment" hereinafter) will be described with reference to the drawings, in every respect, the present embodiment that will be described below is merely an example of the present invention. As a matter of course, various alternations and modifications can be made without departing from the scope of the invention. That is, implementing the present invention, a specific configuration may be suitably adopted according to the embodiment. The data appearing in the present embodiment is described with natural language; however, in actuality, it is represented by pseudo language, a command, a parameter, machine language, etc. that can be recognized by a computer.

An object of the present embodiment is to provide a technique that facilitates a setting of a communication parameter suitable for the communication environment.

§ 1 APPLICATION EXAMPLE

Figure 1:
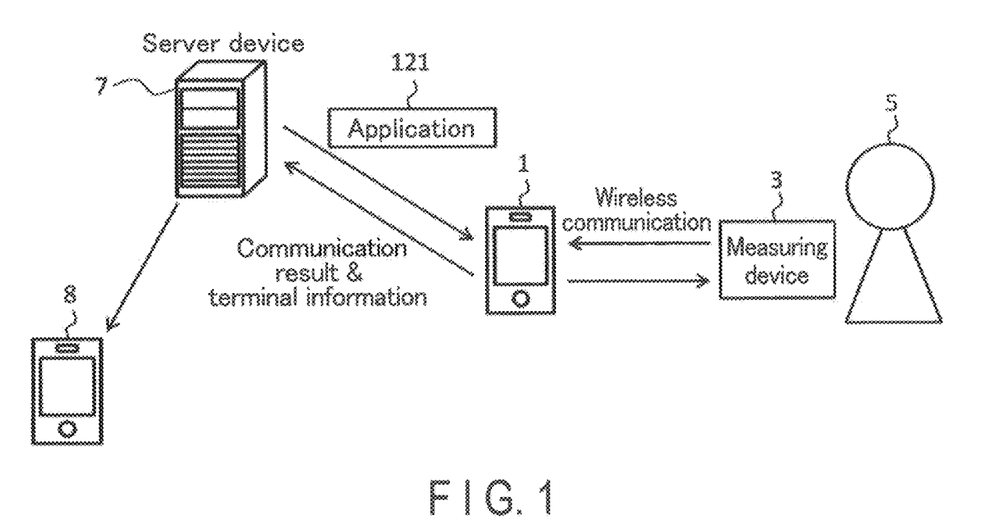
FIG. 1 schematically illustrates an example of a scene to which the present invention is applied.

First, with reference to FIG. 1, an example of a scene to which the present invention is applied will be described. FIG. 1 schematically illustrates an example of a scene to which a method of setting a communication parameter according to the embodiment is applied.

In the present embodiment, a description will be given of an example in which the present invention is applied to a scene where a measuring device 3 is an example of an external device performing wireless communication with a user terminal, an application 121 that cooperates with the measuring device 3 is distributed to each user terminal, and wireless communication is performed between each user terminal and the measuring device 3. However, the application target of the present invention may not be limited to such an example, and may be appropriately selected according to the embodiment.

As shown in FIG. 1, as a use form of the measuring device 3, the application 121 provided from an external server device 7 is installed in the user terminal 1 so that the user terminal 1 manages a measurement result from the measuring device 3. The measuring device 3 is, for example, a weight and body composition monitor, a blood pressure monitor, an activity monitor, a blood glucose measuring device, a pedometer, a thermometer, or the like, and is configured to perform measurement on a biological object of a user 5 and transmit a measurement result through wireless communication. The application 121 is software for collecting the measurement result from such a measuring device 3 and managing the collected measurement result.

After measurement by the measuring device 3, the user 5 operates the user terminal 1 to activate the application 121, thereby collecting the measurement results by the measuring device 3 and checking the history of the collected measurement results based on a graph or the like. The user terminal 1 is configured to be capable of performing wireless communication with the measuring device 3 for performing information processing of the application 121. The user terminal 1 corresponds to the "user terminal" or the "first user terminal" of the present invention.

When establishing a wireless communication connection with the measuring device 3, the user terminal 1 performs the following operation. First, the user terminal 1 determines a communication parameter value used for wireless communication with the measuring device 3 by selecting one communication parameter set from a plurality of communication parameter sets each defining a communication parameter value or by receiving designation of a communication parameter value by the user 5. Next, the user terminal 1 attempts to perform wireless communication with the measuring device 3 based on the determined communication parameter value. Then, the user terminal 1 reports the result of the wireless communication attempt and the own terminal information to the external server device 1.

By such an operation of the user terminal 1, information indicating whether wireless communication with the measuring device 3 is successful when the designated communication parameter value is used is stored in the server device 7 in association with the terminal information. The server device 7 identifies a user terminal 8 of the same type as the user terminal 1 based on the terminal information. This user terminal 8 corresponds to the "second user terminal" of the present invention. The "same type" means that at least one of the model and the OS is the same. Whether the OS is the same may be determined based on the type of the OS, or may be determined based on the type and version of the OS. The server device 7 reflects the communication result obtained from the user terminal 1 on the user terminal 8 identified to be of the same type as the user terminal 1.

For example, if the communication parameter value with which wireless communication with the measuring device 3 has been successful is reported as the attempt result, the server device 7 applies this communication parameter value setting to the user terminal 8 as it is. Thereby, the communication, parameter setting for performing wireless communication with the measuring device 3 can be made automatically and appropriately in the user terminal 8.

On the other hand, if the communication parameter value with which wireless communication with the measuring device 3 has failed is reported as the attempt result, the server device 7 excludes this communication parameter value setting reported from the user terminal 1 from the communication parameter value setting candidates to be applied to the user terminal 8. Thereby, in the user terminal 8, it is possible to avoid inappropriate communication parameter setting, and to narrow down the communication parameter setting candidates to be applied to the user terminal 8.

As described above, according to the present embodiment, the user terminal 1 can attempt to perform wireless communication with the measuring device 3 while appropriately switching the communication parameter values. Then, the result of the wireless communication attempt, i.e., information indicating whether wireless communication with the measuring device 3 has been successful when the designated communication parameter value has been used can be associated with the terminal information of the user terminal 1, and stored in the external server device 7. Thereby, it is possible to collect knowledge about whether or not wireless communication with the measuring device 3 is successful when the designated communication parameter value is applied to a predetermined communication environment. Based on this knowledge, as described above, a setting of a communication parameter appropriate for each user terminal can be easily performed.

Therefore, according to the present embodiment, a setting of a communication parameter in accordance with the communication environment can be easily performed. In addition, the provider of the application 121 no longer needs to examine in advance the setting of the communication parameter value in accordance with the communication environment. Furthermore, even if a setting of the appropriate communication parameter value is not examined in advance for each communication environment, because information on the communication result of each user terminal is stored, the appropriate communication parameter value setting can be automatically made in each communication environment.

In the present embodiment, the user terminal that attempts to connect to the measuring device 3 through wireless communication and reports the communication result when the designated communication parameter value is used is referred to as the user terminal 1 (first user terminal), while the user terminal to which the result is applied is referred to as the user terminal 8 (second user terminal). However, the role of each user terminal may not be fixed to the one side reporting the communication result and the side to which the result is applied. That is, the communication result of another user terminal of the same type may be reflected on the user terminal 1, or the user terminal 8 may report the result of the communication with the measuring device 3. Further, the type of each user terminal (1, 8) may not be limited to one type, and there may be plural types.

§ 2 CONFIGURATION EXAMPLE

[Hardware Configuration]
<User Terminal>

Figure 2:
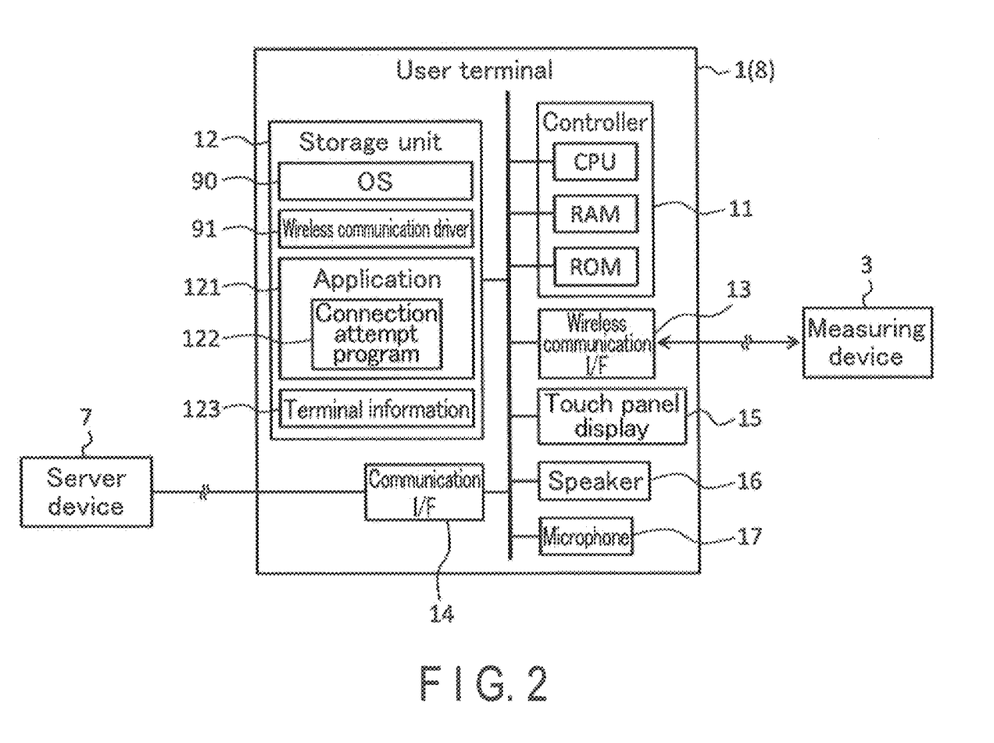
FIG. 2 schematically illustrates an example of a hardware configuration of a user terminal according to the embodiment.

Next, with reference to FIG. 2, an example of a hardware configuration of the user terminal 1 according to the present embodiment will be described. FIG. 2 schematically illustrates an example of a hardware configuration of the user terminal 1 according to the present embodiment.

As shown in FIG. 2, the user terminal 1 according to the present embodiment is a computer including a controller 11, a storage unit 12, a wireless communication interface 13, a communication interface 14, a touch panel display 15, a speaker 16, and a microphone 17, all electrically connected. In FIG. 2, the interface is indicated as "I/F".

The controller 11, includes a central processing unit (CPU) as a hardware processor, a random access memory (RAM), a read only memory (ROM), etc., and controls each component in accordance with information processing. The CPU corresponds to the "processor" of the present invention.

The storage unit 12 is configured by a hard disk drive, a solid state drive, an optical disk, a magnetic disk, a flash memory, a memory card, or the like. In the storage unit 12, various types of data such as an OS 90, a wireless communication driver 91, the application 121, a connection attempt program 122, and terminal information 123 are stored in a state that data can be used by the controller 11. The storage unit 12 corresponds to the "memory" of the present invention.

The OS 90 may be appropriately selected in accordance with the model of the user terminal 1. If the user terminal 1 is a smartphone, for example, 105 (registered trademark), Android (registered trademark), or the like, may be employed as the OS 90. The wireless communication driver 91 is a driver for performing wireless communication by the wireless communication interface 13.

As described above, the application 121 is software for collecting the measurement result from the measuring device 3 and managing the collected measurement result. The measurement result is collected when the application 121 is activated after a connection through wireless communication is established between the user terminal 1 and the measuring device 3.

The connection attempt program 122 is a program for causing the user terminal 1 to perform information processing (FIG. 9), which will be described later, for determining a communication parameter value and attempting a connection through wireless communication. The terminal information 123 may be information that can identify the type of the user terminal 1, and includes, for example, information indicating the model of the user terminal 1 and the type of the OS 90.

In the present embodiment, the connection attempt program 122 is incorporated in the application 121. However, the form of providing the connection attempt program 122 may not be limited to such an example. The connection attempt program 122 may be provided separately from the application 121. Details of the connection attempt program will be described later.

The wireless communication interface 13 is an interface for performing wireless communication with an external device such as the measuring device 3, and is appropriately configured to be capable of performing wireless communication with the external device. In the present embodiment, the wireless communication interface 13 is a Bluetooth (registered trademark) module. Therefore, the wireless communication driver 91 is a Bluetooth (registered trademark) driver. With this wireless communication interface 13, the user terminal 1 is configured to be capable of wirelessly communicating with an external device such as the measuring device 3.

The communication interface 14 is, for example, a wired local area network (LAN) module, a wireless LAN module, or the like, and is an interface for performing wired or wireless communication with an external device such as the external server device 7. The types and communication standards of the wireless communication interface 13 and the communication interface 14 may be appropriately selected according to the connection target. Further, if the measuring device 3 and the server device 7 are connected with the same communication standard, the wireless communication interface 13 and the communication interface 14 may be a single interface.

The touch panel display 15 may be a well-known one, and is used for inputting a message, displaying an image, etc. The user 5 can operate the user terminal 1 via the touch panel display 15. The speaker 16 and the microphone 17 may be a well-known one, and are used for outputting and inputting sound.

For the specific hardware configuration of the user terminal 1, components can be omitted, replaced, and added as appropriate according to the embodiment. For example, the controller 11 may include a plurality of hardware processors. The hardware processor may be configured by a microprocessor, a field-programmable gate array (FPGA), or the like. As the user terminal 1, an information processing apparatus designed exclusively for the provided service or a portable terminal such as a desktop PC, a tablet PC, or a smartphone may be used.

Further, the user terminal 1 may be connected to a drive device or the like for reading data stored into the storage medium. In this case, the application 121 may be provided via a storage medium. When a drive device is connected to the user terminal 1, the application 121 including the connection attempt program 122 may be stored in the storage medium. The storage medium is a medium storing information such as programs recorded thereon in an electronic, magnetic, optical, mechanical, or chemical manner so that the information such as programs is readable for a computer, device or machine. The storage medium is, for example, a compact disk (CD), a digital versatile disk (DVD), a flash memory, or the like.

The user terminal 8 of the same type as the user terminal 1 is configured in the same manner as the user terminal 1. However, the hardware configurations of the user terminal 1 and the user terminal 8 may not be completely the same. The hardware configurations of the user terminal 1 and the user terminal 8 may be different from each other as long as the communication environment with the measuring device 3 is not changed, that is, communication is possible with the same communication parameter setting, <Measuring Device>

Figure 3:
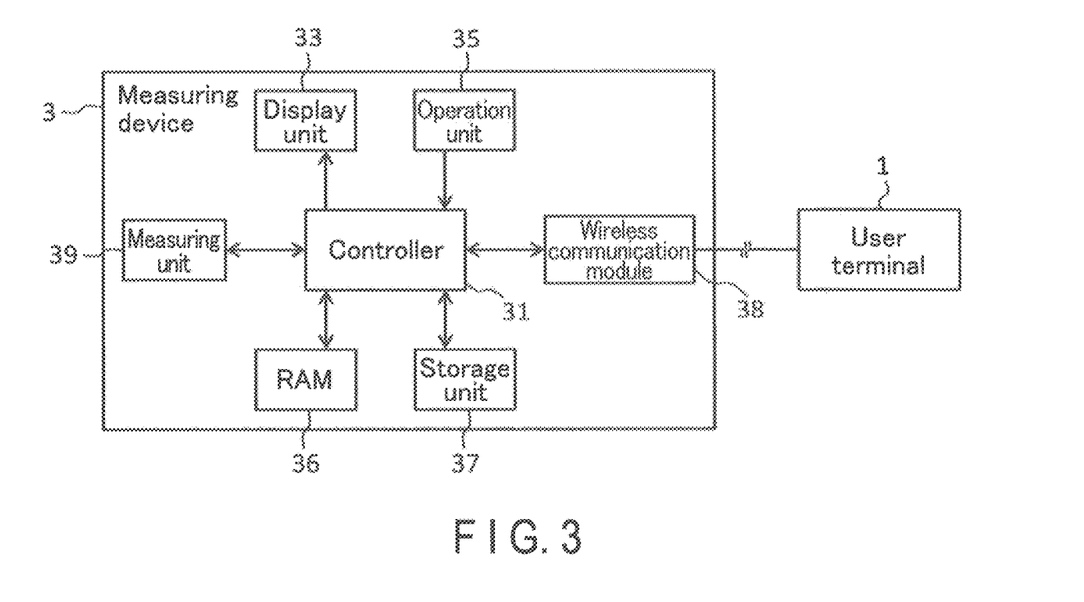
FIG. 3 schematically illustrates an example of a hardware configuration of a measuring device according to the embodiment.

Next, with reference to FIG. 3, an example of a hardware configuration of the measuring device 3 according to the present embodiment will be described. FIG. 3 schematically illustrates an example of the hardware configuration of the measuring device 3 according to the embodiment. The measuring device 3 is appropriately configured to be capable of measuring the biological object of the user 5, and transmitting the measurement result through wireless communication.

As shown in FIG. 3, the measuring device 3 according to the present embodiment is a computer including a controller 31, and including a display unit 33, an operation unit 35, a RAM 36, a storage unit 37, a wireless communication module 38, and a measuring unit 39, all connected to the controller 31. The measuring device 3 is, for example, a weight and body composition monitor, a blood pressure monitor, an activity monitor, a blood glucose measuring device, a pedometer, a thermometer, or the like, and may be configured as appropriate according to the type of information to be measured.

The controller 31 is configured to control the operation of each unit by, for example, a microcomputer, a field-programmable gate array (FPGA), or the like. The display unit 33 is configured to be capable of displaying various information by, for example, a liquid crystal display, an organic EL display, or the like. The operation unit 35 is appropriately configured to be capable of accepting a user operation with, for example, a button, a touch panel, or the like. The operation unit 35 may be configured with a button physically provided on the measuring device 3. When a touch panel display is used as the display unit 33, the operation unit 35 may be configured with a virtual button displayed on the display unit 33.

The RAM 36 may be a DRAM, SRAM, or the like, and it temporarily stores data and is used as a work storage area for the controller 31. The storage unit 37 may be configured by a hard disk drive, a solid state drive, an optical disk, a magnetic disk, a flash memory, a memory card, or the like, and stores biological object data obtained by measurement (for example, various measurement values, index values calculated from the measurement values, etc.).

The wireless communication module 38 is similar to the above-described wireless communication interface 13, and is appropriately configured to be capable of wirelessly communicating with a terminal such as the user terminal 1. In the present embodiment, the wireless communication module 38 is a Bluetooth (registered trademark) module. However, the type and communication standard of the wireless communication module 38 may not be limited to such an example, and may be appropriately selected according to the embodiment.

The measuring unit 39 may be appropriately configured according to the measurement target. For example, the measuring unit 39 may be configured by a sensor that measures information of a blood pressure, a pulse, a weight, a body fat, a visceral fat, the number of steps, an activity amount, a blood glucose level, a body temperature, or the like. If the current position of the measuring device 3 is measured, the measuring unit 39 may include a receiving circuit that receives a global positioning system (GPS) signal. By being configured to be capable of measuring the current position, the measuring device 3 can measure the walking distance, etc. of the user 5.

The controller 31 stores, in the storage unit 37, data of a blood pressure, a pulse, a weight, a body fat, a visceral fat, the number of steps, an activity amount, a blood glucose level, a body temperature, etc. measured by the measuring unit 39, as biological object data. The controller 31 calculates various information such as a body age, a skeletal muscle rate, and a body mass index (BMI), based on the measurement value obtained by the measurement, and stores the calculated various information as biological object data in the storage unit 37. The skeletal muscle rate can be calculated based on the set values of height, age, an impedance and a weight, and their measurement values. Based on this skeletal muscle rate, the basal metabolic rate can be calculated. Further, based on this basal metabolic rate, the body age can be calculated. The relationship between the skeletal muscle rate and the basal metabolic rate and the relationship between the basal metabolic rate and the body age may be given by a predetermined calculation formula, or may be given by a correspondence table.

Examples of the measuring device 3 capable of performing wireless communication as described above include a blood pressure monitor (HEM-7281T, HEM-7271T, etc.), a weight and body composition monitor (HBF-25T, etc.), and an activity meter (HJA-405T, etc.), manufactured by OMRON Corporation.

For the specific hardware configuration of the measuring device 3, components can be omitted, replaced, and added as appropriate according to the embodiment in a manner similar to the user terminal 1. Further, in the measuring device 3 according to the present embodiment, the portion that measures information about the biological object of the user 5 (measuring unit 39) and the portion that performs various information processing (controller 31, RAM 36, storage unit 37, and wireless communication module 38) are integrated. However, the configuration of the measuring device 3 may not be limited to such an example. For example, the measuring device 3 may be configured in such a manner that the portion performing various information processing is configured by a general purpose PC or the like, and the general purpose PC is connected to a device that measures information about the biological object of the user 5.

<Server Device>

Figure 4:
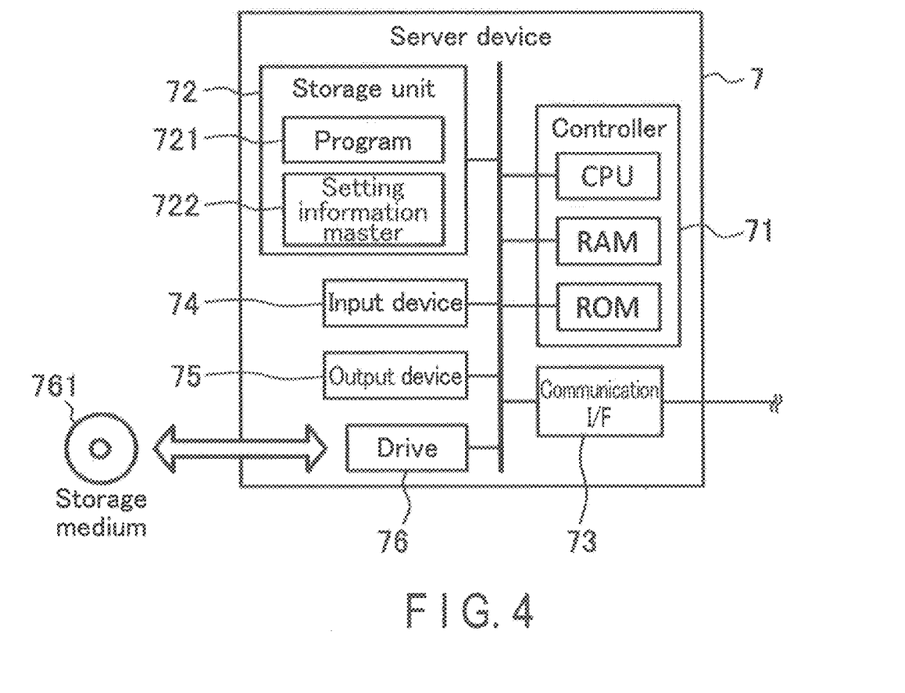
FIG. 4 schematically illustrates an example of a hardware configuration of a server device according to the embodiment.

Next, with reference to FIG. 4, an example of the hardware configuration of the server device 7 according to the present embodiment will be described. FIG. 4 schematically illustrates an example of a hardware configuration of the server device 7 according to the present embodiment.

As shown in FIG. 4, the server device 7 according to the present embodiment is a computer in which a controller 71, a storage unit 72, a communication interface 73, an input device 74, an output device 75, and a drive 76 are electrically connected. In FIG. 4, the interface is indicated as "I/F" as in FIG. 2.

The controller 71 includes a CPU as a hardware processor, RAM, ROM, and the like, and controls each component in accordance with information processing. The storage unit 72 may be configured by a hard disk drive, a solid state drive, an optical disk, a magnetic disk, a flash memory, a memory card, or the like, and stores a program 721 executed by a controller 71, a setting information master 722, and the application 121 (not shown) provided to each user terminal.

The program 721 is a program for causing the server device 7 to perform information processing described later for reflecting the communication result acquired from the first user terminal (user terminal 1 in the present embodiment) on the second user terminal (user terminal 8 in the present embodiment) of the same type as the first user terminal. The setting information master 722 stores the communication result acquired from each user terminal. That is, the setting information master 722 stores information indicating whether or not the wireless communication with the measuring device 3 has been successful when the designated communication parameter value is used in the target communication environment (target user terminal). Details will be described later.

The communication interface 73 is, for example, a wired LAN module, a wireless LAN module, or the like, and is an interface for performing wired or wireless communication via a network. Via this communication interface 73, the server device 7 can perform data communication with each user terminal (1, 8) via the network. Note that the type of network may be appropriately selected from, for example, Internet, a wireless communication network, a mobile communication network, a telephone network, an exclusive network, and the like.

The input device 74 is a device for performing input such as a mouse, a keyboard, etc. The output device 75 is a device for performing output such as a display, a speaker, etc. The operator can operate the server device. 7 via the input device 74 and the output device 75.

The drive 76 is, for example, a CD drive, a DVD drive, or the like, and is a drive device for reading the program stored in the storage medium 761. The type of the drive 76 may be appropriately selected in accordance with the type of the storage medium 761. The program 721, may be stored in the storage medium 761.

The storage medium 761 is a medium storing information such as programs recorded thereon in an electronic, magnetic, optical, mechanical, or chemical manner so that the information such as programs is readable for a computer, device or machine. The server device 7 may acquire the program 721 from the storage medium 761.

FIG. 4 shows a disk-type storage medium of a CD, DVD or the like, as an example of the storage medium 761. However, the type of the storage medium 761 may not be limited to the disk type and may be other than the disk type. An example of the storage medium other than the disk type includes a semiconductor memory such as a flash memory.

For the specific hardware configuration of the server device 7, components can be omitted, replaced, and added as appropriate according to the embodiment. For example, the controller 71 may include a plurality of processors. The server device 7 may be configured by one or more computers. As the server device 7, an information processing device designed exclusively for the service to be provided or a well-known server device forming a cloud may be used.

[Software Configuration]

<User Terminal>

Figure 5:
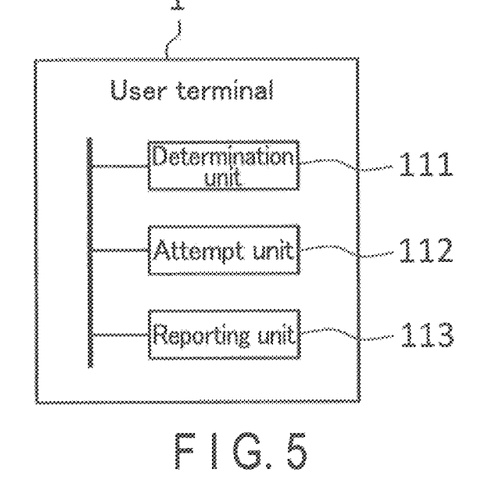
FIG. 5 schematically illustrates an example of a software configuration of the user terminal according to the embodiment.

Next, with reference to FIG. 5, an example of the software configuration of the user terminal 1 according to the present embodiment will be described. FIG. 5 schematically illustrates an example of the software configuration of the user terminal 1 according to the present embodiment.

The controller 11 of the user terminal 1 expands the connection attempt program 122 stored in the storage unit 12 in the RAM. Then, the controller 11 interprets and executes, courtesy of the CPU, the connection attempt program 122 expanded in the RAM to control each component. Thus, as shown in FIG. 5, the user terminal 1 according to the present embodiment is configured as a computer that includes a determination unit 111, an attempt unit 112, and a reporting unit 113, as software modules.

The determination unit 111 selects one communication parameter set from a plurality of communication parameter sets each defining the communication parameter value, or accepts designation of the communication parameter value by the user 5, thereby determining the communication parameter value used for wireless communication with the measuring device 3. The attempt unit 112 attempts wireless communication with the measuring device 3 based on the determined communication parameter value. The reporting unit 113 reports the result of the wireless communication attempt and the terminal information of the own device to the external server device 7.

<Server Device>

Figure 6:
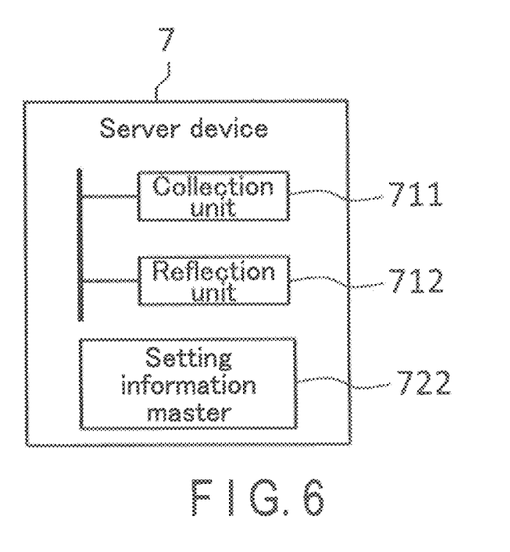
FIG. 6 schematically illustrates an example of a software configuration of the server device according to the embodiment.

Next, with reference to FIG. 6, an example of the software configuration of the server device 7 according to the present embodiment will be described. FIG. 6 schematically illustrates an example of the software configuration of server device 7 according to the present embodiment.

The controller 71 of the server device 7 expands the program 721 stored in the storage unit 72 in the RAM. Then, the controller 71 interprets and executes, courtesy of the CPU, the program 721 expanded in the RAM to control each component. Thus, as shown in FIG. 6, the server device 7 according to the present embodiment is configured as a computer that includes a collection unit 711 and a reflection unit 712 as a software module.

The collection unit 711 collects information indicating the result of the wireless communication attempted between the user terminal 1 and the measuring device 3, and terminal information 123, from the user terminal 1. The collected information indicating the communication result is associated with the terminal information 123, and stored in the setting information master 722. The reflection unit 712 reflects the communication result of the user terminal 1 with the measuring device 3 on the user terminal 8 of the same type as the user terminal 1 based on the terminal information.

In particular, the collection unit 711 collects the communication parameter value with which wireless communication between the user terminal 1 and the measuring device 3 has been successful. In response to this, the reflection unit 712 applies, to the user terminal 8, the setting of the communication parameter value with which the wireless communication between the user terminal 1 and the measuring device 3 has been successful.

(Setting Information Master)

Figure 7:
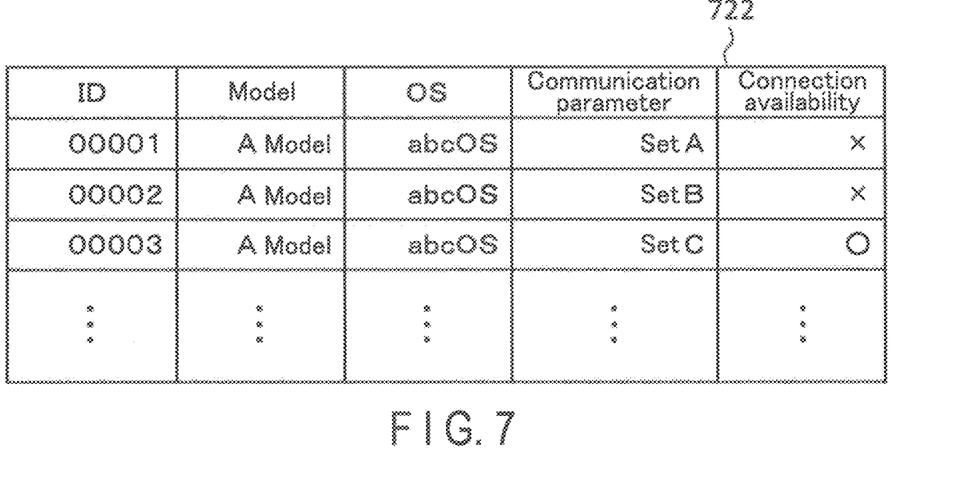
FIG. 7 schematically illustrates an example of a data configuration of a setting information master according to the embodiment.

Next, with reference to FIG. 7, a description will be given of an example of a data configuration of a setting information master 722 that stores the communication result of each user terminal. FIG. 7 schematically illustrates an example of the data configuration of the setting information master 722 according to the present embodiment.

The setting information master 722 according to the present embodiment is master data for managing the communication result of each user terminal, and includes fields for holding an ID, model, OS, communication parameter, and connection availability. In the table illustrated in FIG. 7, one line of data (one record) corresponds to data indicating one communication result.

The ID field stores identifiers for identifying records in the table. The model field stores information indicating the model of the user terminal of the transmission source of the communication result. The OS field stores information indicating the OS of the user terminal of the transmission source of the communication result. That is, the model field and the OS field store the terminal information 123 associated with the communication result.

The communication parameter field stores communication parameter values used when the communication result is obtained. If the communication parameter value is determined using a predetermined communication parameter set, information that designates the communication parameter set may be stored in the communication parameter field as illustrated in FIG. 7. The connection availability field stores information indicating whether data communication with the measuring device 3 through wireless communication has been successful when the communication parameter value has been used. That is, the communication parameter field and the connection availability field store information indicating the communication result reported from each user terminal.

Therefore, the top two records of the table shown in FIG. 7 indicate that the wireless communication with the measuring device 3 has failed when the communication parameter values designated in the sets A and B has been used in the user terminal 1 in which the model is "A model" and the OS 90 is "abcOS". The third record from the top indicates that the wireless communication with the measuring device 3 has been successful when the communication parameter value designated in the set C has been used in the user terminal 1 of the same type.

Note that the configuration of the setting information master 722 may not be limited to such an example, and may be appropriately determined according to the embodiment. Further, the method of managing (and storing) the communication result and the terminal information 123 reported from each user terminal may not be limited to the method using the setting information master 722. For a method of managing these pieces of information, a well-known method may be appropriately used.

In the example of FIG. 7, the setting information master 722 is represented by a table format. However, a data format of the setting information master 722 may not be limited to the table format, and a data format other than the table format may be adopted for the setting information master 722. Furthermore, the value stored in each record of FIG. 7 is shown for convenience in explaining the present embodiment, and may not be limited to such an example. The value stored in each record may be appropriately designated according to the embodiment.

Further, the storage location of the setting information master 722 may not be limited to the storage unit 12 as long as it is accessible when the controller 11 (CPU) uses it, and may be appropriately determined according to the embodiment. For example, the setting information master 722 may be stored in an external storage device such as a network attached storage (NAS) that can be accessed from the server device 7 via the network.

<Others>

The software modules of the user terminal 1 and the server device 7 will be described in detail in the operation example below. The present embodiment describes an example in which each software module of the user terminal 1 and the server device 7 is realized by a general purpose CPU. However, part or all of the above-described software modules may be realized by one or more dedicated processors. In addition, for the software configurations of the user terminal 1 and the server device 7, software modules may be omitted, replaced, and added as appropriate according to the embodiment.

§ 3 OPERATION EXAMPLE

[Processing Procedure of Wireless Communication]

Figure 8:
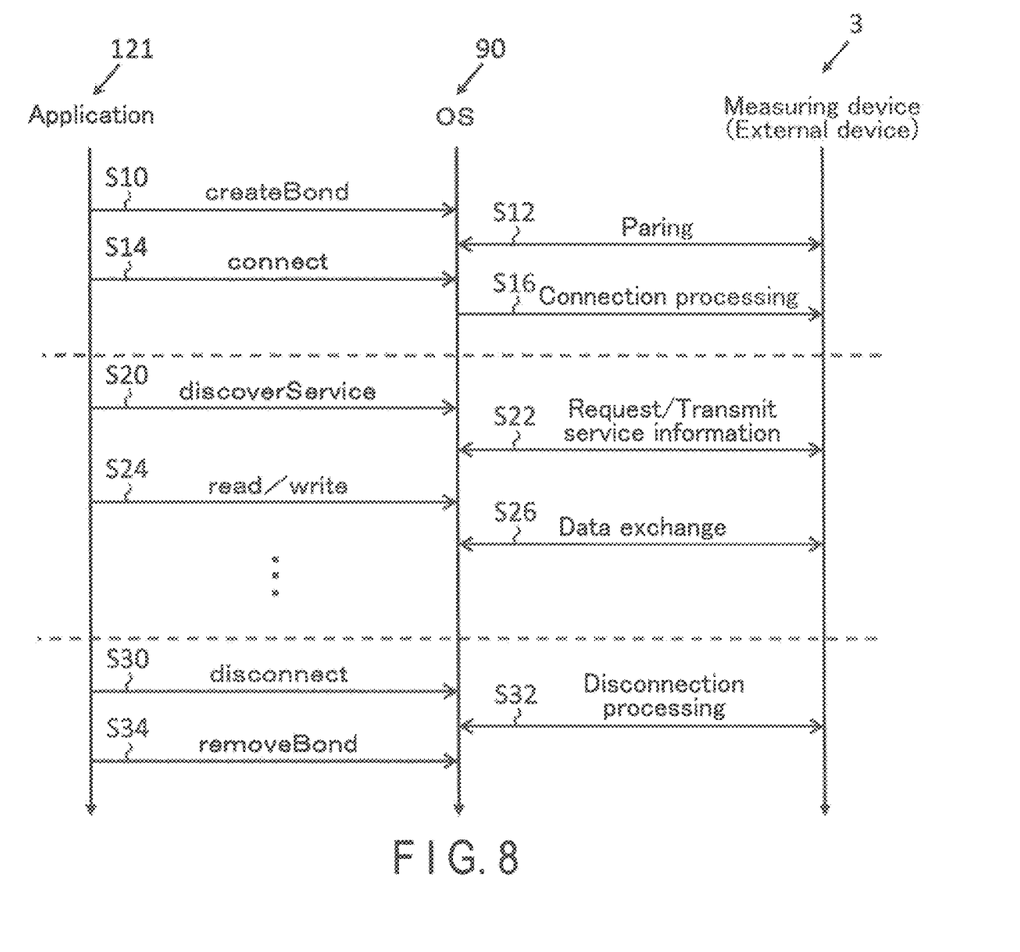
FIG. 8 illustrates an example of a processing procedure when connection is established through wireless communication between the user terminal and the measuring device according to the embodiment.

Next, with reference to FIG. 8, a description will be given of a processing procedure when the user terminal 1 performs wireless communication according to the Bluetooth (registered trademark) standard with an external device such as the measuring device 3. In the present embodiment, since the wireless communication driver 91 is incorporated into the OS 90, the OS 90 provides an application programming interface (API) for performing wireless communication by the wireless communication interface 13, to an application (for example, the application 121) executed on the user terminal 1. Hereinafter, for convenience of explanation, a description will be given of a scene in which the application 121 performs wireless communication with the measuring device 3 using an API provided by the OS 90. Note that in the following, for convenience of explanation, an API provided by Android (registered trademark) is exemplified as an API provided by the OS 90. However, the communication parameters to which the present invention is applied may not be limited, to those related to the API provided by Android (registered trademark), and may be appropriately selected according to the embodiment.

(Steps S10 to S16)

Steps S10 to S16 are processes for establishing a connection through wireless communication between the user terminal 1 and the measuring device 3.

First, in step S10, the controller 11 of the user terminal 1 performs "createBond" for the OS 90 as an operation of the application 121. The "createBond" is a method for instructing the start of pairing. In next step S12, the controller 11 performs a pairing process with the measuring device 3 as an operation of the OS 90.

In next step S14, the controller 11 performs "connect" for the OS 90 as an operation of the application 121. The "connect" is a method for making a connection request. In next step S16, the controller 11 establishes a connection by Bluetooth (registered trademark) with the measuring device 3 as an operation of the OS 90. In this manner, data can be exchanged through wireless communication between the user terminal 1 and the measuring device 3. If the connection process in step S16 fails, the processes of steps S14 and S16 are retried.

(Steps S20 to S26)

Steps S20 to S26 are processes for exchanging data between the user terminal 1 and the measuring device 3 after the wireless communication connection is established.

First, in step S20, the controller 11 performs "discoverService" for the OS 90 as an operation of the application 121. The "discoverService" is a method for requesting service information included in the measuring device 3. In next step S22, the controller 11 requests service information for the measuring device 3 as an operation of the OS 90. In response to this, the measuring device 3 transmits the service information held by itself to the user terminal 1. The service information indicates types of service held by the measuring device 3. As a result, the user terminal 1 can access each service included in the measuring device 3.

In next step S24, the controller 11 performs "read" or "write" as necessary as an operation of the application 121. In next step S26, as an operation of the OS 90, the controller 11 reads data of the designated service of the measuring device 3, or writes data in the designated service of the measuring device 3, in response to the request from the application 121. The measurement result of the measuring device 3 is stored in a predetermined service, and the user terminal 1 reads the data of this service, thereby obtaining the measurement result from the measuring device 3. Thereafter, steps S24 and S26 are repeated, and data is exchanged through wireless communication between the user terminal 1 and the measuring device 3.

(Steps S30 to S34)

Steps S30 to S34 are processes for disconnecting the wireless communication connection between the user terminal 1 and the measuring device 3.

In step S30, the controller 11 performs "disconnect" for the OS 90 as an operation of the application 121. In next step S32, the controller 11 performs a process of disconnecting the wireless communication connection with the measuring device 3 as an operation of the OS 90. Then, in next step S34, the controller 11 performs "removeBond" for the OS 90 as an operation of the application 121. The "removeBond" is a method for deleting the encryption information used in the pairing by the "createBond" described above. In this manner, the wireless communication connection between the user terminal 1 and the measuring device 3 is disconnected, and a series of processes related to the wireless communication is completed. Note that the user terminal 8 can also perform wireless communication with the measuring device 3 in the same procedure.

(Regarding Communication Parameter)

In the wireless communication procedure as described above, the values of the communication parameters such as the necessity of performing "createBond" in step S10, the timing of performing "connect" in step S14 after step S10, the number of times to retry "connect" in step S14, the timing of performing "discoverService" in step S20 after step S14, and the necessity of performing "removeBond" in step S34 may vary depending on the model and the type of OS.

For example, the timing of performing the pairing process in step S12 after "createBond" is performed in step S10 may vary depending on the model and the type of OS. Therefore, if "connect" in step S14 is performed at a specific timing, while there is a user terminal of a type in which the pairing process in step S12 has been completed and the connection process of step S16 will be appropriately completed, there is also a user terminal of a type in which the pairing process in step S12 has not been completed and the connection process of step S16 cannot be appropriately performed.

In addition, for example, while there is a user terminal of a type in which performance of "createBond" in step S10 is not appropriately processed at the next connection opportunity if "removeBond" in step S34 is not performed, there is also a user terminal of a type in which performance of "createBond" in step S10 is appropriately processed at the next connection opportunity even if "removeBond" in step S34 is not performed.

Therefore, in order for each user terminal to exchange data with the measuring device 3 through wireless communication, each communication parameter value as described above must be appropriately set. Accordingly, in the present embodiment, by the following operation of the user terminal 1, the result of the user terminal 1 attempting wireless communication with the measuring device 3 is collected in association with the terminal information 123 using a specific communication parameter value. In this manner, knowledge regarding whether or not wireless communication with the measuring device 3 is successful when the designated communication parameter value is applied to a predetermined communication environment is obtained, and the setting of a communication parameter suitable for each user terminal is facilitated.

[Operation Example of User Terminal]

Figure 9:
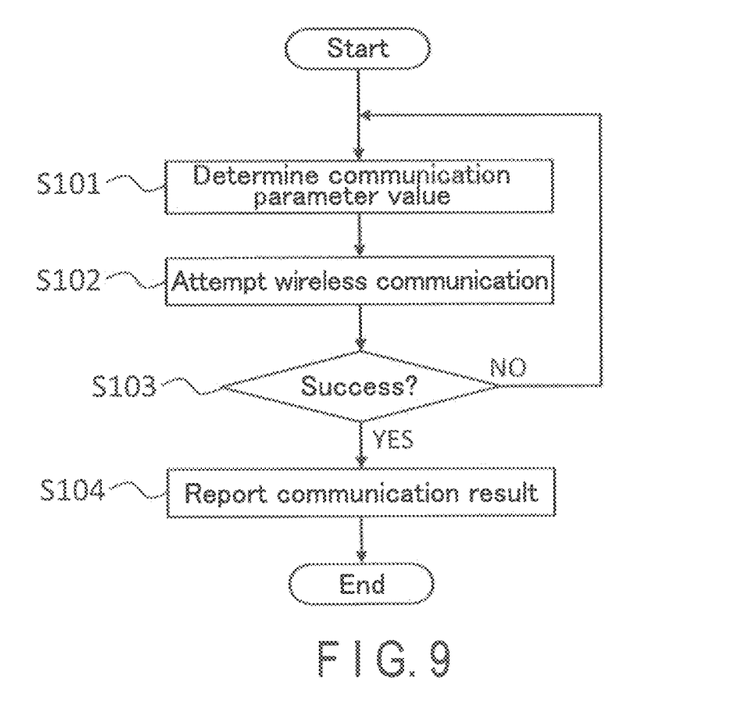
FIG. 9 illustrates an example of a processing procedure when the user terminal attempts to perform a wireless communication according to the embodiment.

Next, with reference to FIG. 9, an operation example of the user terminal 1 will be described. FIG. 9 is a flowchart illustrating an example of a processing procedure of the user terminal 1 according to the embodiment. The processing procedure of the user terminal 1 described below and the processing procedure of the server device 7 described later correspond to the "method of setting a communication parameter" of the present invention. The processing procedure described below is merely an example, and the processes may be changed where possible. In the processing procedure described below, steps may be appropriately omitted, substituted, and added, according to the embodiment.

(Assumption)

In the present embodiment, the user terminal 1 performs wireless communication with the measuring device 3 using the application 121, and collects the measurement result of the measuring device 3. Thus, before the cooperation with the measuring device 3, that is, before wireless communication is performed with the measuring device 3, the application 121 is provided from the server device 7 to the user terminal 1.

When the application 121 is provided, the controller 11 accesses the setting information master 722 of the server device 7, and inquires whether or not the communication result of the user terminal of the same type as the own device is stored. If the communication result of the user terminal of the same type as the own device is stored, the controller 11 acquires the communication result of the user terminal of the same type as the own device, similarly to the user terminal 8 described later. Then, the controller 11 reflects the acquired communication result on the setting of the communication parameter value of the user terminal 1.

On the other hand, if the communication result of the same type as the own device is not stored, the controller 11 appropriately determines the communication parameter value by the following process of the connection attempt program 122, and attempts wireless communication with the measuring device 3 using the determined communication parameter value. Then, the controller 11 reports, to the server device 7, information indicating whether the wireless communication between the user terminal 1 and the measuring device 3 has been successful when the designated communication parameter value has been used. In this manner, according to the present embodiment, the server device 7 can store information indicating the communication result of each user terminal. Hereinafter, the processing procedure of the connection attempt program 122 will be described.

(Step S101)

First, in step S101, the controller 11 operates as the determination unit 111, and determines the communication parameter value used for wireless communication with the measuring device 3 by selecting one communication parameter set from a plurality of communication parameter sets each defining the communication parameter value or by receiving designation of the communication parameter value by the user 5. That is, in the present embodiment, the communication parameter value used for wireless communication is determined by one of two methods, a method in which selection is made from multiple communication parameter sets, and a method in which the user 5 directly makes designation.

A method in which one communication parameter set is selected from a plurality of communication parameter sets can be appropriately set according to the embodiment. For example, selecting a communication parameter set may include a step of presenting a plurality of communication parameter sets to the user 5, and a step of receiving from the user 5 a selection of one communication parameter set to be used for wireless communication with the measuring device 3 from the plurality of communication parameter sets presented.

Figure 10:
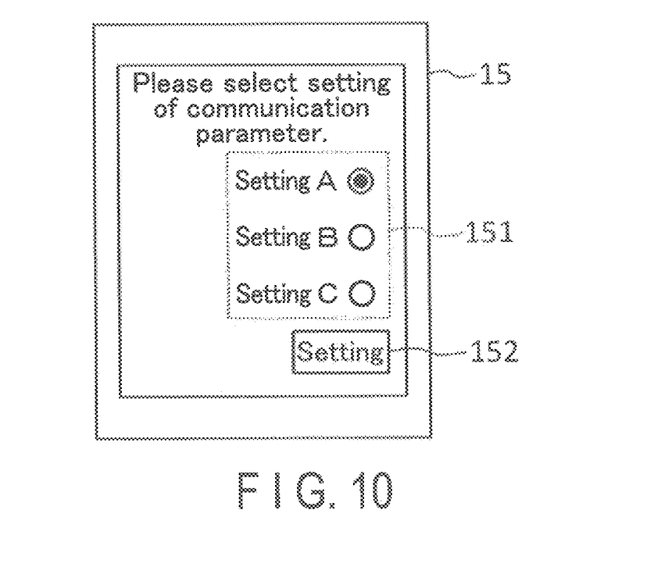
FIG. 10 schematically illustrates an example of a screen for receiving selection of communication parameter sets.

FIG. 10 illustrates an example of a screen for accepting a selection of a communication parameter set by such a method. The screen shown in FIG. 10 includes an area 151 where one communication parameter set is designated with a radio button, and a button 152 for selecting the designated one communication parameter set as a communication parameter set used for wireless communication. For each communication parameter set, a communication parameter value is set in advance to be different from one another.

The controller 11 displays the screen illustrated in FIG. 10 on the touch panel display 15 to present a plurality of communication parameter sets to the user 5, and accepts a selection of one communication parameter set from the presented plurality of communication parameter sets. The user 5 designates a communication parameter set by checking a radio button in the area 151, and operates the button 152, thereby selecting the designated communication parameter set as a communication parameter set used for wireless communication.

However, the method in which one communication parameter set is selected from a plurality of communication parameter sets may not be limited to the method described above. For example, the controller 11 may automatically select one communication parameter set from a plurality of communication parameter sets based on a predetermined condition (for example, in a numerical order, randomly, etc.).

In addition, the method in which the communication parameter value is designated by the user 5 can be set as appropriate according to the embodiment. For example, the controller 11 may accept designation of a communication parameter value by numerical entry. Further, for example, the controller 11 may accept designation of a communication parameter value by operation of a slider bar displayed on the touch panel display 15.

In the present embodiment, for a method of determining the communication parameter value used for wireless communication, two methods are employed, a method in which selection is made from a plurality of communication parameter sets, and a method in which designation is directly made by the user 5. However, both of these two methods do not necessarily have to be prepared. That is, either one of these two methods may be omitted.

Note that the type of the target communication parameter may be appropriately determined according to the embodiment. For example, the target communication parameter may be at least one of the necessity of performing "createBond", the timing of performing "connect", the number of times to retry "connect", the timing of performing "discoverService", and the necessity of performing "removeBond" described above.

(Step S102)

In next step S102, the controller 11 operates as the attempt unit 112, and attempts wireless communication with the measuring device 3 based on the communication parameter value determined in step S101. Using the communication parameter value determined in step S101, the controller 11 attempts to exchange data through wireless communication with the measuring device 3 according to the wireless communication processing procedure described above.

(Step S103)

In next step S103, the controller 11 determines whether data exchange with the measuring device 3 through wireless communication has been properly performed in step S102. If data exchange with the measuring device 3 through wireless communication has been properly performed, the controller 11 advances the process to next step S104. On the other hand, if data exchange with the measuring device 3 through wireless communication has not been performed properly, the controller 11 returns the process to step S101. In this manner, the controller 11 repeatedly performs the processes of steps S101 and S102 until wireless communication with the measuring device 3 is successful.

(Step S104)

In next step S104, the controller 11 operates as the reporting unit 113, and reports to the external server device 7 the result of the wireless communication attempt in step S102 and the terminal information 123 of the own device.

If data exchange with the measuring device 3 through wireless communication has not been performed properly in step S102, the controller 11 reports to the server device 7 the communication parameter value with which wireless communication with the measuring device 3 has failed, as the result of the wireless communication attempt. On the other hand, if data exchange with the measuring device 3 through wireless communication has been properly performed in step S102, the controller 11 reports to the server device 7 the communication parameter value with which wireless communication with the measuring device 3 has been successful, as the result of the wireless communication attempt. If steps S101 and S102 are repeatedly performed, the controller 11 reports to the server device 7 the result of the attempt of each step.

If the communication parameter is determined by selection of the communication parameter set in step S101, the controller 11 may report information (for example, identifier) designating the communication parameter set as the communication parameter value.

In this manner, the controller 11 ends the processing according to this operation example. Such processing brings the user terminal 1 in a state in which data can be exchanged with the measuring device 3 through wireless communication. Therefore, after performing measurement on the biological object using the measuring device 3, the user 5 operates the user terminal 1 to activate the application 121, thereby collecting the measurement result from the measuring device 3. Then, the collected measurement result can be displayed on the touch panel display 15.

Figure 11:
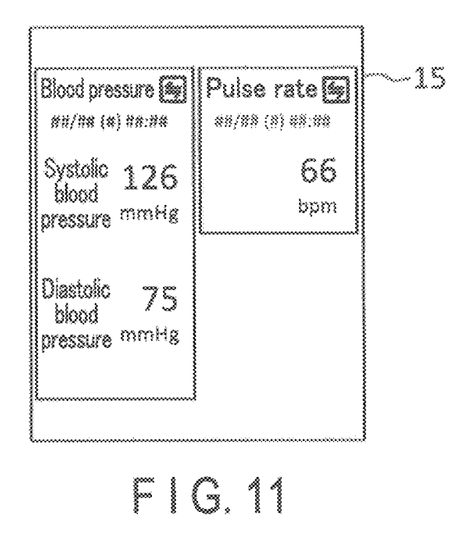
FIG. 11 illustrates an example of an application screen.

FIG. 11 schematically illustrates an example of the screen of the application 121 displayed on the touch panel display 15. The screen example of FIG. 11 displays panels showing the measurement result of the blood pressure and that of the pulse rate. By looking at the information displayed on each panel, the user 5 can recognize the measurement result obtained by the measuring device 3.

[Operation Example of Server Device]

Figure 12:
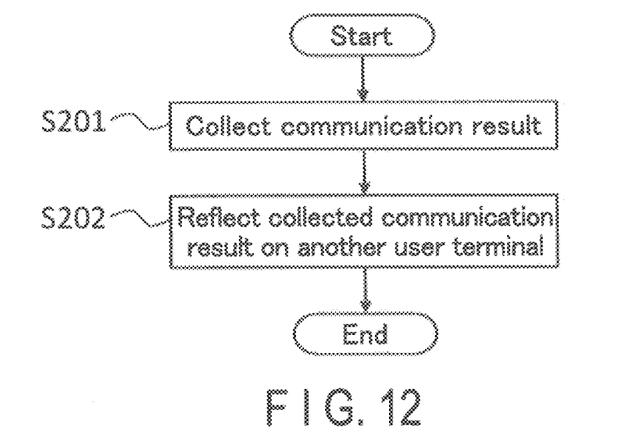
FIG. 12 illustrates an example of a processing procedure of the server device according to the embodiment.

Next, with reference to FIG. 12, an operation example of the server device 7 will be described. FIG. 12 is a flowchart illustrating an example of a processing procedure of the server device 7 according to the present embodiment. The processing procedure described below is merely an example, and the processes may be changed where possible. In the processing procedure described below, steps may be appropriately omitted, substituted, and added, according to the embodiment.

(Step S201)

In step S201, the controller 71 operates as the collection unit 711, and collects information indicating the result of wireless communication attempted between the user terminal 1 and the measuring device 3 and the terminal information 123 that are reported from the user terminal 1.

Specifically, in response to the successful wireless communication between the user terminal 1 and the measuring device 3 in step S102, the controller 71 collects, in this step S201, the communication parameter value with which wireless communication has been successful, together with the terminal information 123. On the other hand, in response to the unsuccessful wireless communication between the user terminal 1 and the measuring device 3 in step S102, the controller 71 collects, in step S201, the communication parameter value with which wireless communication has failed, together with the terminal information 123.

Then, the controller 71 stores each collected information in the setting information master 722. For example, the controller 71 newly prepares one record for one attempt, and stores the communication result and the terminal information 123 in each field of the record prepared. As a result, the setting information master 722 stores information indicating whether wireless communication with the measuring device 3 is successful when the designated communication parameter value is used in the target user terminal.

(Step S202)

In next step S202, the controller 71 operates as the reflection unit 712, and reflects the communication result between the user terminal 1 and the measuring device 3 on the user terminal 8 of the same type as the user terminal 1 based on the terminal information 123.

For example, the controller 71 acquires terminal information from the user terminal 8. Then, the controller 71 collates the values stored in the model field and the OS field of the setting information master 722 with the terminal information acquired from the user terminal 8.

By the series of processes in steps S101 to S104 performed by the user terminal 1, the communication result of the user terminal 1 is stored in the setting information master 722. Therefore, as the result of the collation, the controller 71 can acquire the communication result of the user terminal 1 of the same type as the user terminal. 8 from the setting information master 722.

Moreover, in the present embodiment, the processes of steps S101 and S102 are repeated until wireless communication between the user terminal 1 and the measuring device 3 is successful in step S103. Therefore, in step S202, the controller 71 can acquire the communication parameter value with which wireless communication between the user terminal 1 and the measuring device 3 has been successful as the communication result of the user terminal 1. Therefore, in the present embodiment, the controller 71 applies the setting of the communication parameter value acquired to the user terminal 8 as it is.

It is preferable that the setting of the communication parameter value is applied when the user terminal 8 performs wireless communication with the measuring device 3 for the first time. For example, when the application 121 is provided in response to the request from the user terminal 8, the controller 71 may perform this step S202, and apply the communication parameter value with which wireless communication between the user terminal 1 and the measuring device 3 has been successful to the user terminal 8. However, the timing at which the communication result of the user terminal 1 is reflected on another user terminal of the same type may not be limited to such an example, and may be appropriately selected according to the embodiment.

In this manner, the controller 71 ends the processing according to this operation example. If the series of processes of steps S101 to S104 is not performed at the user terminal 1, the communication result of the user terminal 1 is not stored in the setting information master 722. In this case, the server device 7 may acquire the communication result with the measuring device 3 from the user terminal 3 by causing the user terminal 8 to perform the processes of steps S101 to S104.

[Features]

As described above, according to the present embodiment, with the processes of steps S101 to S103, the user terminal 1 can attempt to perform wireless communication with the measuring device 3 while appropriately switching the communication parameter values. Then, with the process of step S104, information, indicating whether wireless communication with the measuring device 3 has been successful when the designated communication parameter value has been used, can be stored in the external server device 7 in association with the terminal information 123 of the user terminal 1. Therefore, it is possible to collect knowledge about whether or not wireless communication with the measuring device 3 is successful when the designated communication parameter value is applied to a predetermined communication environment, and thus, a setting of a communication parameter in accordance with the communication environment can be easily performed.

Further, according to the present embodiment, the above-described knowledge can be collected by the operation of the user terminal 1 when a wireless communication connection is established with the measuring device 3. Therefore, even if the provider of the application 121 does not examine the setting of the communication parameter value according to the communication environment in advance, the user terminal 1 can identify the communication parameter value suitable for the communication environment.

Moreover, if the wireless communication between the user terminal 1 and the measuring device 3 has been successful in the above-described step S102, that is, if the setting of the communication parameter value suitable for the target communication environment has been found, its setting can be applied to another user terminal of the same type as the user terminal 1 in the above-described step S202. Therefore, according to the present embodiment, even if the setting of a suitable communication parameter value is not examined in advance for each communication environment, because the communication result information of each user terminal is stored, it is possible to automatically set an appropriate communication parameter value in each communication environment.

§ 4 MODIFICATION

Although the embodiment of the present invention has been described in detail in the foregoing, the description is merely an example of the present invention in all of its aspects. Various improvements and modifications can of course be made to the embodiment to the extent that does not deviate from the scope of the present invention. The following modifications may be made for example. In the following, the same reference numerals are used for the same components of the foregoing embodiment, and redundant descriptions are omitted as appropriate. The following modifications can be combined as appropriate.

<4.1>

In the above-described embodiment, the measuring device 3 has been exemplified as an example of an external device that performs wireless communication with the user terminal (1, 8). However, the type of the external device may not be limited to such a measuring device, and may be appropriately selected from those capable of performing wireless communication with the user terminal according to the embodiment.

<4.2>

In the above-described embodiment, in both cases where wireless communication with the measuring device 3 succeeds and fails, the user terminal 1 (controller 11) reports the communication parameter value of each case to the server device 7 as the result of the wireless communication attempt in step S104. However, contents reported to the server device 7 may not be limited to such an example. For example, in either of the cases where wireless communication with the measuring device 3 succeeds and fails, the result of the wireless communication attempt may not be reported to the server device 7.

Moreover, in the present embodiment described above, the processes of steps S101 and S102 are repeated until the wireless communication between the user terminal 1 and the measuring device 3 is successful in the process of step S103. However, the processing procedure of the user terminal may not be limited to such an example, and step S103 may be omitted.

In this case, even if the series of processes of steps S101 to S104 is performed, the communication parameter value when the wireless communication between the user terminal 1 and the measuring device 3 is successful may not be found. Therefore, the setting information master 722 may not store the communication parameter value with which wireless communication with the measuring device 3 has been successful.

If the setting information master 722 does not store the communication parameter value with which wireless communication with the measuring device 3 has been successful, the setting information master 722 stores the communication parameter value with which wireless communication with the measuring device 3 has failed. In step S202, the controller 71 may exclude the setting of the communication parameter value with which wireless communication with the measuring device 3 has failed from the communication parameter value setting candidates to be applied to the user terminal 8. Thereby, it is possible to avoid inappropriate communication parameter setting in the user terminal 8, and to narrow down the communication parameter setting candidates to be applied to the user terminal 8.

<4.3>

In the embodiment described above, Bluetooth (registered trademark) is adopted as a standard for wireless communication between each user terminal (1, 8) and the measuring device 3. However, a standard for wireless communication between each user terminal (1, 8) and the measuring device 3 may not be limited to such an example, and may be appropriately selected according to the embodiment. For example, near field communication (NFC) may be used as a standard for wireless communication between each user terminal (1, 8) and the measuring device 3.

<4.4>

In the example of FIG. 1 described above, the external server device 7 has a role of providing the application (software) 121 and a role of collecting the communication result of the User terminal 1. However, the configuration for providing the application 121 and the configuration for holding the communication result of the user terminal 1 may not have to be limited to such an example. For instance, the server that provides the application 121 may be separated from the server that stores the communication result of the user terminal 1. The server that provides the application 121 may be, for example, a dedicated server that also provides an application other than the application 121.

<4.5>

In the above-described embodiment, the application 121 is software to collect measurement results of the measuring device 3 and manage the collected measurement results. However, the type of the application 121 may not be limited to such an example, and may be appropriately selected according to the embodiment. Further, the connection attempt program 122 may not be incorporated in the application 121 and may be provided to each user terminal alone.

EXPLANATION OF REFERENCE NUMERALS

1. User terminal (first user terminal)
11. Controller
12. Storage unit
13. Wireless communication interface
14. Communication interface
15. Touch panel display
16. Speaker
17. Microphone
111. Determination unit
112. At unit
113. Reporting unit
121. Application
122. Connection attempt program
123. Terminal information
90. OS
91. Wireless communication driver
3. Measuring device
31. Controller
33. Display unit
35. Operation unit
36. RAM
37. Storage unit
38. Wireless communication module
39. Measuring unit
5. User
7. Server device
71. Controller
72. Storage unit
73. Communication interface
74. Input device
75. Output device
76. Drive
761. Storage medium
711. Collection unit
712. Reflection unit
721. Program
722. Setting information master
8. User terminal (second user terminal)

The invention claimed is:

1. A user terminal comprising:
one or more processors;
a memory storing a program executable by the one or more processors; and
a wireless communication interface configured to perform wireless communication with an external device, wherein according to the program, the one or more processors perform:
a first step of determining a communication parameter value used for direct wireless communication between the external device and the user terminal by selecting one communication parameter set from a plurality of communication parameter sets each defining a communication parameter value or by receiving designation of a communication parameter value by a user;
a second step of controlling the wireless communication interface to make an attempt of the direct wireless communication between the external device and the user terminal based on the determined communication parameter value, the determined communication parameter value including a timing of performing a method for requesting service information from the external device after establishing the direct wireless communication; and
a third step of reporting a result of the attempt and terminal information of an own device to an external server device, the result of the attempt including information indicating a communication parameter value which has been used for the direct wireless communication between the external device and the user terminal, and information indicating whether or not the direct wireless communication between the external device and the user terminal has been successful.

2. The user terminal according to claim 1, wherein in the third step, the one or more processors report a communication parameter value with which the direct wireless communication between the external device and the user terminal has been successful, as the result of the attempt.

3. The user terminal according to claim 1, wherein in the third step, the one or more processors report a communication parameter value with which the direct wireless communication between the external device and the user terminal has failed, as the result of the attempt.

4. The user terminal according to claim 1, wherein the one or more processors repeatedly perform the first step and the second step until the direct wireless communication between the external device and the user terminal is successful.

5. The user terminal according to claim 1, wherein the first step includes:
presenting the plurality of communication parameter sets to the user; and
receiving from the user a selection of the one communication parameter set used for the direct wireless communication between the external device and the user terminal from the plurality of communication parameter sets presented.

6. The user terminal according to claim 1, wherein a system of the wireless communication is Bluetooth (registered trademark).

7. A server device comprising:
one or more processors; and
a memory storing a program executable by the one or more processors,
wherein according to the program, the one or more processors perform:
collecting, from a first user terminal configured to perform direct wireless communication between the first user terminal and an external device, information indicating a communication parameter value which has been used for the direct wireless communication between the first user terminal and the external device, information indicating that the direct wireless communication between the first user terminal and the external device has been successful, and terminal information of the first user terminal, the communication parameter value including a timing of performing a method for requesting service information from the external device after establishing the direct wireless communication; and
applying, based on the terminal information, a setting of the communication parameter value with which the direct wireless communication between the first user terminal and the external device has been successful, to a second user terminal of a same type as the first user terminal.

8. The server device according to claim 7, wherein when the second user terminal first performs wireless communication with the external device, the one or more processors apply the setting of the communication parameter value with which wireless communication between the first user terminal and the external device has been successful to the second user terminal.

9. A method of setting a communication parameter, the method comprising:
a first step of determining, at a first user terminal configured to perform direct wireless communication between the first user terminal and an external device, a communication parameter value used for the direct wireless communication between the first user terminal and the external device by selecting one communication parameter set from a plurality of communication parameter sets each defining a communication parameter value or by receiving designation of a communication parameter value by a user;
a second step of making, at the first user terminal, an attempt of the direct wireless communication between the first user terminal and the external device based on the determined communication parameter value, the determined communication parameter value including a timing of performing a method for requesting service information from the external device after establishing the direct wireless communication; and
a third step of reporting, at the first user terminal, a result of the attempt and terminal information of an own device to an external server device, the result of the attempt including information indicating a communication parameter value which is used for the direct wireless communication between the first user terminal and the external device, and information indicating whether or not the direct wireless communication between the first user terminal and the external device has been successful.

10. The method according to claim 9,
wherein in the third step, the first user terminal reports a communication parameter value with which the direct wireless communication between the first user terminal and the external device has been successful, as the result of the attempt, and
the method further comprises a fourth step of applying, at the server device and based on the terminal information, a setting of the communication parameter value with which the direct wireless communication between the first user terminal and the external device has been successful, to a second user terminal of a same type as the first user terminal.

* * * * *